Feb. 6, 1962           K. NEGORO           3,019,481

VARIABLE ORIFICE EXTRUSION DIE

Filed July 16, 1959           3 Sheets-Sheet 1

INVENTOR
KAIJI NEGORO

BY
Mason, Porter, Diller & Stewart
ATTORNEYS

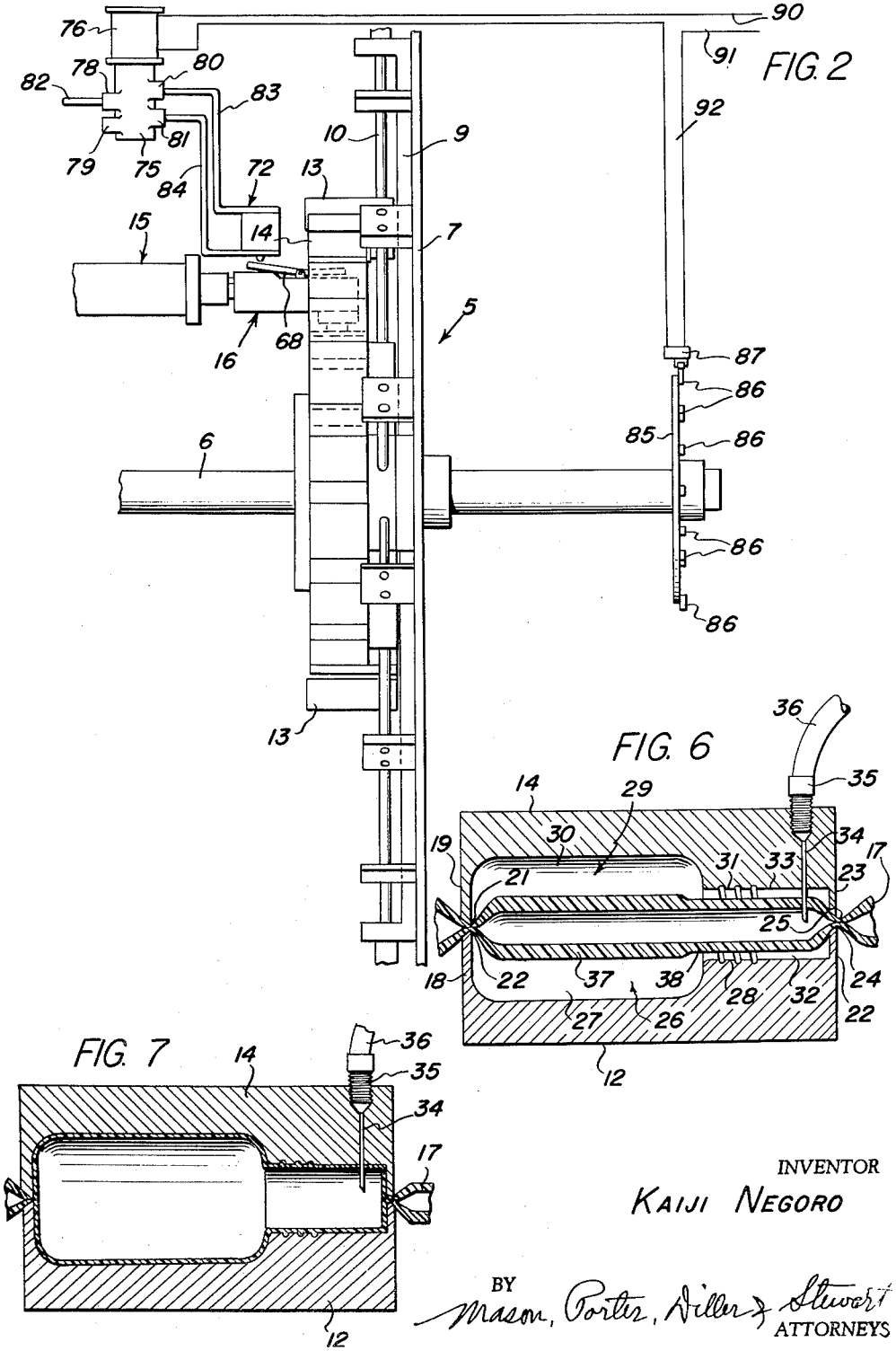

Feb. 6, 1962 K. NEGORO 3,019,481
VARIABLE ORIFICE EXTRUSION DIE
Filed July 16, 1959 3 Sheets-Sheet 3
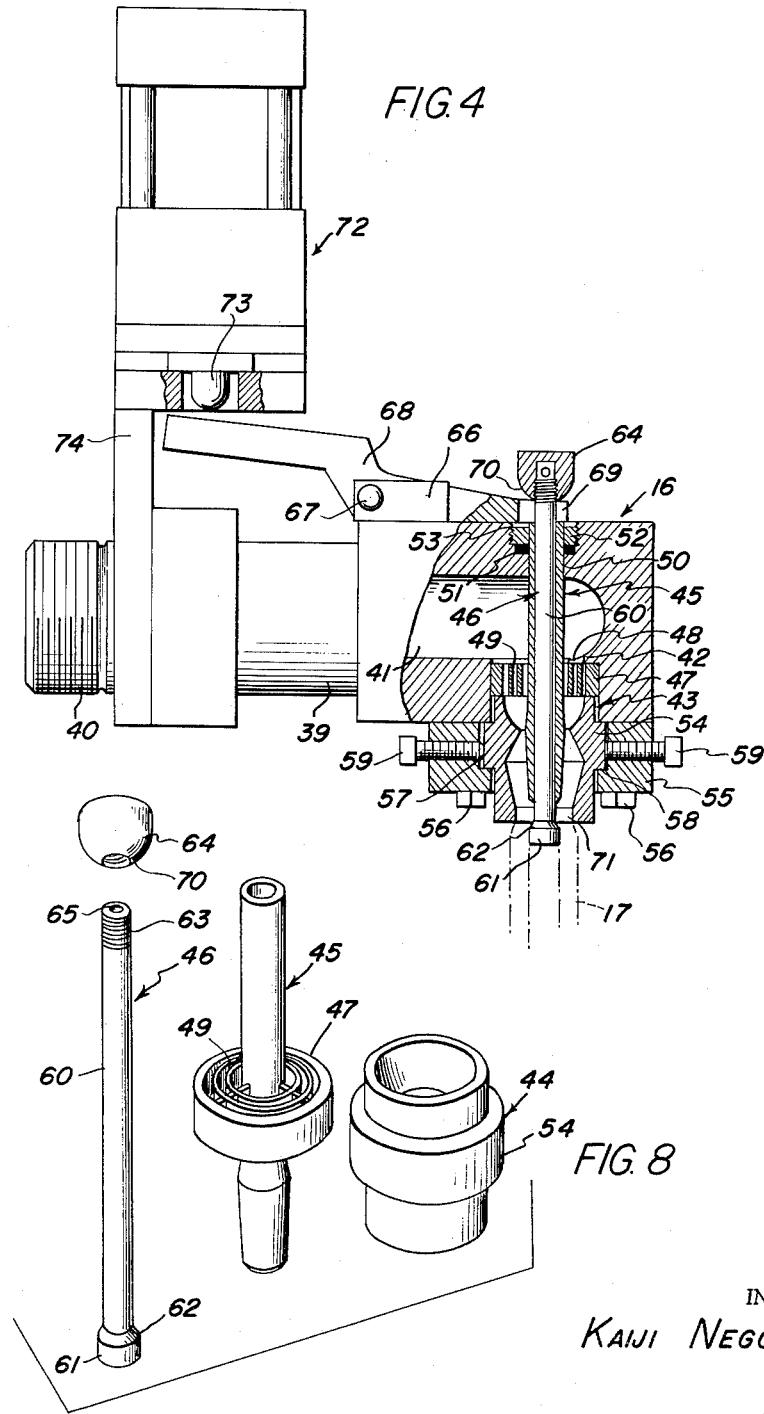
INVENTOR
KAIJI NEGORO
BY
Mason, Porter, Diller & Stewart
ATTORNEYS

United States Patent Office 3,019,481
Patented Feb. 6, 1962

3,019,481
VARIABLE ORIFICE EXTRUSION DIE
Kaiji Negoro, West Hartford, Conn., assignor to Continental Can Company, Inc., New York, N.Y., a corporation of New York
Filed July 16, 1959, Ser. No. 827,470
6 Claims. (Cl. 18—5)

The invention generally relates to the art of forming hollow articles by the expansion of tubing within a mold, and primarily seeks to provide a novel machine for forming hollow articles of varying cross-section wherein the wall thickness of the article is substantially uniform.

At the present time, hollow articles, such as plastic bottles, are formed from a continuously extruded tube of a constant wall thickness. As the tube is extruded, it is gripped by molds and sections of the tube are isolated and sealed at their ends, after which, fluid under pressure is introduced into the isolated sections to expand the tube to conform to the shape of the mold cavity. A typical machine for carrying forth this method is disclosed in the patent to Ruekberg et al., 2,784,452, issued March 12, 1957. Since the article formed by this method normally has areas of reduced cross-section, for example, the neck of a bottle, the uneven expansion of the tubing results in undesired varying wall thicknesses in the finished product. In the case of a bottle, it has been necessary to ream the neck portion to reduce the wall thickness thereof. Further, at the present time, the ratio between the cross-sections of the articles formed by this method is undesirably restricted. For example, it is not feasible to form a plastic bottle by this method wherein the bottle has a very large diameter body and a relatively small diameter neck.

It is therefore another object of the invention to provide a novel extruder for a machine which forms hollow articles by expanding a tube within a mold, the extruder having a variable orifice die which is of such a construction that the thickness of the tubing may be varied during the extrusion process so that portions of the tubing which are to be expanded the least will have a lesser wall thickness, with the result that the finished article will have a substantially uniform wall thickness.

Another object of the invention is to provide a novel extrusion die for use in conjunction with a machine for forming hollow articles from tubing, the extrusion die being of a variable orifice type and having a core which includes a large end portion for determining the final internal diameter of the tubing, the core being of a reduced cross-section immediately adjacent the enlarged end portion, and the core being longitudinally shiftable through the die shell so that the enlarged end portion or the reduced cross-sectional portion of the core may be aligned with the orifice-defining portion of the die shell, and thus control the wall thickness of the tubing.

A further object of the invention is to provide a variable orifice extrusion die which includes a longitudinally shiftable core, and wherein the core has an enlarged end portion and a reduced cross-sectional portion immediately adjacent the enlarged end portion, the enlarged end portion determining the internal diameter of the tube extruded from the die and being normally urged out of the die shell by the material being extruded through the die, whereby the reduced cross-sectional portion of the core is aligned with the orifice-defining portion of the die shell, and there being provided means for longitudinally shifting the core during an extrusion process so that the enlarged end portion of the core may be moved into cooperating alignment with the orifice-defining portion of the die shell to reduce the wall thickness of the tube while maintaining the internal diameter.

Another object of the invention is to provide a novel variable orifice extrusion die for use on an extruder of a machine for molding hollow articles by the process of expanding a tube within a mold, the extrusion die having a core of varying cross-section and which core is mounted for longitudinal movement with respect to the die shell during the extrusion process, and there being provided means for shifting the core in timed relation to the operation of the machine, whereby relatively thin wall portions of the tube may be aligned with the minimum cross-sectional portion of a mold cavity so that the finished article formed by expanding the tube within the mold will have generally a constant wall thickness.

An object of the invention is to provide a novel extrusion die head for use with a plastic extruding machine, the die head having a discharge orifice and an axially movable core provided with an enlarged end movable exteriorly of the orifice for varying the wall thickness of the plastic tube being extruded from the orifice or maintaining a constant inside diameter of the plastic tube.

A further object is to provide an axially movable core of the character referred to in the preceding object which extends through the die head with one end projecting exteriorly of the orifice, and which may be readily removed and replaced with cores having ends of different cross-sections.

Still another object of the invention is to provide a novel extrusion die head for use with a plastic extruding machine in the formation of bottles, the die head being of a construction that the plastic tube being extruded therefrom has a constant inside dimension, which dimension substantially corresponds to the finished inside dimension of the neck of the bottle being formed, thereby eliminating the necessity for a reaming operation.

A further object of the invention is to provide a novel extrusion die head wherein the discharge orifice and the core of the die head have cylindrical surfaces and tapered surfaces are reduced to a minimum, thus minimizing undesirable turbulence in the plastic material being extruded.

A still further object of the invention is to provide a novel extrusion die for use with the extruder of a machine for molding hollow articles from a tube by expanding the tube within a mold, the extrusion die being of a variable orifice type and being provided with a core which is adjustable during the extrusion process so that the thickness of the wall of the tubing may be varied during the extrusion process, the extrusion die being of a nature that it may be used on existing machines by merely replacing the head of the existing extruder with a special head incorporating the extrusion die and by providing additional cams on the cam plate of the machine for operating the extrusion die in timed relation to the operation of the machine.

With the above, and other objects in view that will hereinafter appear, the nature of the invention will be more clearly understood by reference to the following detailed description, the appended claims and the several views illustrated in the accompanying drawing.

In the drawing:

FIGURE 2 is an enlarged vertical schematic view of the machine of FIGURE 1, taken from the right, and shows the general details of the extruder head and the means for operating the variable orifice extrusion die in timed relation to the operation of the machine.

FIGURE 4 is an enlarged elevational view of the extruder head, with portions of the extruder head being broken away and shown in section in order to clearly illustrate the details of the extrusion die mounted therein.

FIGURE 6 is an enlarged fragmentary sectional view and shows the initial relationship of a mold with respect to a section of the extruded plastic tube from the extruder.

FIGURE 7 is an enlarged fragmentary sectional view similar to FIGURE 6, and shows the section of the plastic tube after it has been expanded internally to conform to the configuration of the cavity of the mold.

FIGURE 8 is an enlarged exploded perspective view of the components of the extrusion die.

In the example embodiment of the invention illustrated herein, the variable orifice extrusion die is used in conjunction with an extruder of a machine for forming hollow articles from tubing or tubes. A typical example of such machines is disclosed in the aforementioned Ruekberg et al. patent. In such a machine, a plurality of molds are mounted on a common shaft and rotated in a common plane. Each of the molds is formed in halves which open to receive the tube. The tube is continuously extruded by the extruder with the mold halves passing on opposite sides of the extruder head. As the mold halves close, they close about a portion of the tube, and the molds are so designed that they pinch the tube so as to seal off opposite ends of the section disposed within the mold. As the mold halves grip the tube, an injection needle passes through the tube, and once the mold halves have completely closed and sealed the opposite ends of the tube section, fluid, preferably air under pressure, is introduced into the tube, which is still soft from the extrusion process, with the result that the tube is internally expanded, with the exterior of the expanded tube assuming the shape of the cavity of the mold.

Figure 1:
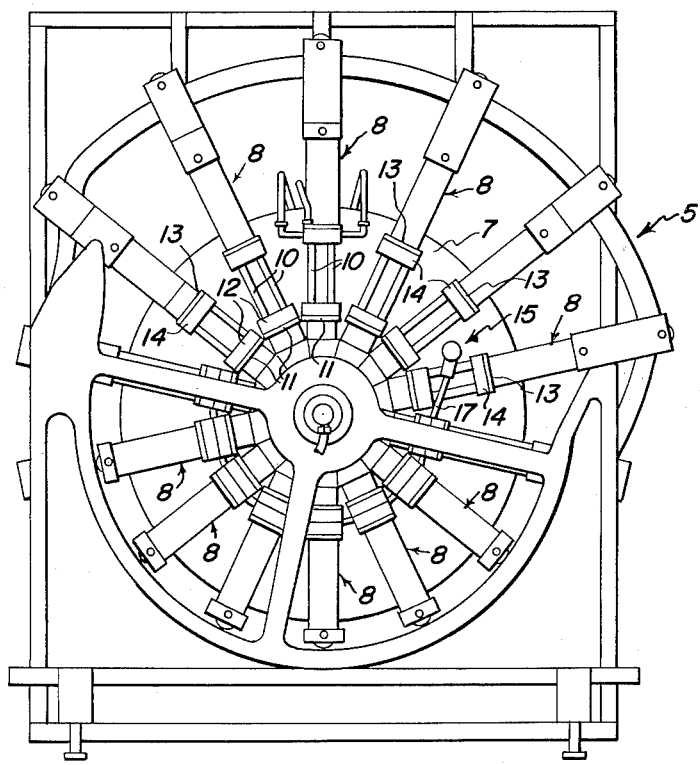
FIGURE 1 is a schematic elevational view of a vertical machine with radially moving molds for forming hollow articles, and shows the position of the extruder with respect to the molds.
Figure 3:
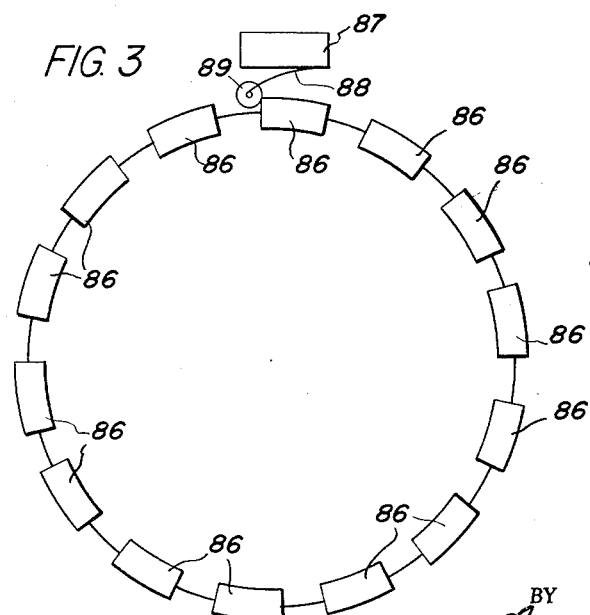
FIGURE 3 is a schematic view of the cam plate and control switch for the extrusion die, and shows the relationship of the cams with respect to the control switch.

A machine corresponding to the machine of the Ruekberg et al. patent is illustrated in FIGURES 1 and 2, and generally referred to by the numeral 5. Since a complete disclosure of the machine 5 is to be found in the Ruekberg et al. patent, only those components of the machine directly involved with this invention will be described in detail.

The machine 5 includes a main shaft 6 which is suitably journaled for rotation and which is driven by mechanism not illustrated. A mold assembly carrier 7 is secured to the shaft 6 for rotation therewith. A plurality of individual mold units, generally referred to by the numeral 8, are secured to a face of the mold assembly carrier 7 in radiating, circumferentially spaced relation. Each of the mold units 8 includes a support bracket 9 which is suitably secured to the face of the mold assembly carrier 7. The support bracket 9 supports a pair of spaced parallel rods 10 which are disposed in parallel relation to the mold assembly carrier 7. A fixed mold support 11 is fixedly secured to the inner ends of the rods 10. A fixed mold half 12 is releasably secured to the fixed mold support 11. A movable mold support 13 is slidably mounted on the rods 10 for movement towards and away from the fixed mold support 11. A movable mold half 14 is carried by the movable mold support 13 and cooperates with the fixed mold half 12. It is to be understood that as the mold assembly carrier 7 rotates, the movable mold halves 14 will move in and out with respect to the fixed mold halves 12. This is best illustrated in FIGURE 1. Movement of the movable mold supports 13 and the movable mold halves 14 is accomplished by means of cams, as shown in FIGURE 1.

An extruder 15 for plastics is suitably mounted in opposed relation to the mold assembly carrier 7, as is clearly shown in FIGURES 1 and 2. The specific construction of the extruder 15 plays no part in the present invention. On the other hand, the extruder 15 includes an extrusion head 16 which is of the right angle type and which has been specially modified to accommodate the variable orifice extrusion die, which is the subject of the invention. The extrusion head 16 is so located that the mold halves 12 and 14, which are open as they pass the extrusion head 16, pass on opposite sides of the extrusion head 16. After each mold unit 8 passes the extruder 15, the movable mold half 14 begins moving towards the fixed mold half 12, and when the mold halves 12 and 14 are in alignment with the tube or tubing 17 extruded by the extruder 15, the mold halves 12 and 14 grip the plastic tube.

Reference is now had to FIGURE 6 wherein the specific construction of the mold halves 12 and 14 is illustrated. The mold half 12 terminates in an end wall 18 which is aligned with an end wall 19 of the mold half 14. The end wall 18 has a tapered edge 20 which opposes a tapered edge 21 of the end wall 19. As the mold half 14 approaches the mold half 12, the plastic tube 17 is clamped between the tapered edges 20 and 21, with the result that the plastic tube 17 is collapsed and sealed at this point.

The mold half 12 also has an end wall 22 which opposes an end wall 23 of the mold half 14. The end walls 22 and 23 have opposed tapered edges 24 and 25, respectively. As the mold half 14 abuts the mold half 12, the tube 17 is also clamped between the tapered edges 24 and 25 so as to collapse and seal the tube 17 at a second point.

The mold halves 12 and 14 are illustrated as having a cavity for the formation of a bottle. It is to be understood that a bottle is only one of many hollow articles which may be made utilizing the machine 5. The mold cavity of the fixed mold half 12 is generally referred to by the numeral 26 and includes a body-defining portion 27 and a neck-defining portion 28. The mold cavity of the movable mold half 14 is generally referred to by the numeral 29 and includes a body-defining portion 30 and a neck-defining portion 31. The neck-defining portions 28 and 31 have extensions 32 and 33 which extend beyond the normal neck of the bottle being formed.

A needle 34 is carried by the movable mold half 14 and extends into the extension 33 of the cavity 29 thereof. The needle 34 has connected to the outer end thereof a fitting 35 to which there is connected an air line 36. When the mold half 14 cooperates with the mold half 12 to clamp the plastic tube 17 therebetween, the needle 34 penetrates the plastic tube 17, as is best shown in FIGURE 6. After the seals have been formed at the opposite ends of the mold halves 12 and 14, compressed air is forced into the plastic tube 17 between these two seals, with the result that the plastic tube 17 is internally expanded and forced into engagement with the mold cavities 26 and 29.

It is to be noted that the plastic tube 17 has a portion 37 of a relatively great wall thickness and a portion 38 of a relatively thin wall thickness. The portions 37 and 38 are alternated with the portion 37 being much shorter than the portion 38. The plastic tube 17 is of the optimum cross-section for forming a plastic bottle as defined by the mold halves 12 and 14. It is to this end that the invention is dedicated. It is also to be noted that the portion 37 is aligned with the body portions 27 and 30 of the cavities 26 and 29. It is the body portion of the finished plastic bottle which undergoes the greatest expansion and as a result, the greatest thinning of the wall during the molding process. By making the portion 37 of a greater thickness, it will be seen, as is illustrated in FIGURE 6, that after the tube 17 has been expanded to the desired configuration, the wall thickness of the article formed is substantially constant throughout.

Reference is now had to FIGURE 4, wherein there are illustrated the details of the extrusion head 16. The extrusion head 16 includes a body 39 which is generally L-shaped in outline and which is provided at one end thereof with an externally threaded portion 40 which is normally threadedly engaged in the extruder 15. The body 39 has a generally L-shaped passage therethrough which includes a horizontal leg 41 and a generally vertical leg 42. An extrusion die, generally referred to by the numeral 43, is seated in the vertical leg 42.

The extrusion die 43 is formed primarily of three parts. These three parts include a die shell 44, a mandrel 45 and a die core 46.

The mandrel 45 includes a support ring 47 which is seated in the vertical leg 42 of the passage through the body 39, and has the upper face thereof in engagement with a shoulder 48. The mandrel proper is connected to the support ring 47 by means of a suitable spider assembly 49 so that the mandrel 45 may be centered with respect to the vertical leg 42. It is to be noted that the mandrel 45 is in the form of an elongated tubular member and extends from a point slightly above the lower end of the die shell 44 to the top of the body 39. The upper part of the body 39 is provided with a bore 50 which tightly receives the upper portion of the mandrel 45. The connection between the body 39 and the upper portion of the mandrel 45 is sealed by means of a gasket 51 which extends about the upper portion of the mandrel 45 and which is clamped against the body 39 by means of a nut 52 which is in the form of a gasket retaining nut and which is threadedly engaged in an internally threaded bore 53 formed in the upper part of the body 39 concentric to the bore 50.

The die shell 44 has an intermediate outwardly directed projection 54. The projection 54 is larger than the vertical leg 42 of the passage through the body 39 and bears against the underside of the body 39. The die shell 44 is held in place by means of a clamp member 55 which is secured to the underside of the body 39 by bolts 56. The clamp member 55 has a socket 57 which receives the projection 54. It is to be noted that the socket 57 is larger than the projection 54 so that the die shell 44 may be shifted with respect to the clamp member 55 and the body 39 of the extrusion head 16. The lower surface of the socket 57 is defined by a shoulder 58 which engages the underside of the projection 54. At this time, it is pointed out that the upper end of the die shell 44 engages the underside of the support ring 47 so as to clamp the support ring 47 in place against the shoulder 48.

The clamp member 55 carries a plurality of setscrews 59 which are disposed on all sides of the clamp member 55 and which are preferably four in number. The setscrews 59 engage the projection 54 so as to center the die shell 44.

The die core 46 includes an elongated shank 60 which is guidedly received in the mandrel 45 for longitudinal sliding movement. The shank 60 projects from both ends of the mandrel 45 and terminates at its lower end in an enlarged end portion 61. The die core 46 is tapered intermediate the enlarged end portion 61 and the shank 60, as at 62.

The upper end of the shank 60 is externally threaded, as at 63. A combination air fitting and stop member 64 is threadedly engaged on the upper end of the shank 60. The die core 46 has a longitudinal air passage 65 extending therethrough. The air passage 65 receives air through the combination air fitting and stop member 64. It is to be noted that the air passage 65 opens through the lower end of the die core 46. Air is continuously forced through the air passage 65 and into the tube 17 so as to maintain the tube 17.

The upper part of the body 39 has secured thereto a pair of ears 66. The ears 66 support a pivot pin 67. A lever 68 is pivotally mounted on the pivot pin 67. One end of the lever 68 is bifurcated, as at 69, with the bifurcated portion of the lever 68 receiving the upper part of the shank 60. The underside of the combination air fitting and stop member 64 is rounded, as at 70, and seats on the bifurcated portion of the lever 68. In this manner, downward movement of the die core 46 is limited to the position illustrated in FIGURE 4.

It is to be noted that the interior of the die shell 44 and the exterior of the lower part of the mandrel 45 are configurated to produce the desired flow of plastic being extruded. The lower part of the mandrel 45 tends to initially shape the extrusion into a tube. However, the main shaping of the extrusion is by the lower part of the die core 46 and by the lower portion of the die shell 44, the lower portion being considered an orifice-defining portion 71. As the plastic material passes down through the die shell 44, the material frictionally engages the exterior surface of the die core 46 and urges the die core 46 to move in the direction of flow of the plastic material. Downward movement of the die core 46 is limited by the combination air fitting and stop member 64. Accordingly, the lower part of the shank 60 is normally aligned with the orifice-defining portion 71 and the wall of the tube 17 extruded when the die core 46 is in this position is relatively thick. The internal diameter of the tube 17 remains constant notwithstanding a variation of wall thickness, since the tube 17 must pass over the enlarged end portion 61 of the die core 46. Therefore, an increase in wall thickness results in an increase in external diameter of the tube 17.

Figure 5:
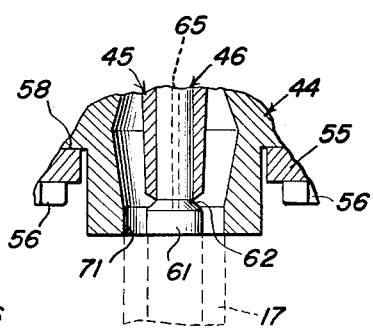
FIGURE 5 is an enlarged fragmentary sectional view taken through the extrusion die and shows the core adjusted with respect to the die shell to form tubing of a minimum wall thickness.

From the illustration of FIGURE 4, it will be readily apparent that should the die core 46 be moved upwardly so that the enlarged end portion 61 thereof be aligned with the orifice-defining portion 71 of the die shell 44, as is shown in FIGURE 5, the effective cross-section of the orifice of the extrusion die 43 would be reduced with the result that the tube 17 would have a reduced wall thickness while maintaining the same internal diameter. It will also be readily apparent that the change in wall thickness of the tube 17 may be brought about during an extrusion process without stopping the extrusion process. Further, it will be apparent that by pivoting the lever 68, the effect of the lever 68 on the combination air fitting and stop member 64 will be to elevate or lift the die core 46 to the position illustrated in FIGURE 5. In view of this, the extrusion die 43 is of the variable orifice type, and the orifice may be varied during the extrusion process.

As pointed out above, and as is clearly illustrated in FIGURE 6, it is desired that the thick wall portion 37 of the tube 17 be aligned with the body portions 27 and 30 of the cavities 26 and 29, respectively. In view of this, it is necessary that the orifice of the extrusion die 43 be adjusted in timed relation to the operation of the machine 5. This is accomplished by means of a small fluid motor of the extensible type, the fluid motor being generally referred to by the numeral 72. The fluid motor 72 may be of any type, but requires at least a plunger, such as the plunger 73, for engaging the lever 68 to pivot the lever 68 about the pivot pin 67. The fluid motor 72 is supported with respect to the extrusion head 16 by means of a bracket 74.

Reference is now had to FIGURE 2, wherein the details of the control for the fluid motor 72 are illustrated. The fluid motor 72 is in the form of an air motor and operation thereof is controlled by means of an air valve 75. The air valve 75 is of the solenoid actuated type and includes a solenoid actuator 76. The air valve 75 includes an inlet fitting 78, an exhaust fitting 79, and a pair of line fittings 80 and 81. An air line 82 which is connected to a suitable pressurized air source (not shown) is connected to the inlet fitting 78. A pair of lines 83 and 84 connect the opposite ends of the fluid motor 72 to the fittings 80 and 81. Since the fluid motor 72 is of the double acting type, it will be seen that the fluid motor 72 may be positively actuated to raise and lower the die core 46.

A cam plate 85 is normally mounted on the shaft 6 of the machine 5. The cam plate 85 normally carries controls for effecting the supplying of air to the needle 34 in the prescribed timed relation. The details of these controls play no part in the present invention, and accordingly are not described here. On the other hand, a plurality of cam elements 86 are secured to the cam plate 85 in radially projecting relation, there being one cam element 86 for each of the mold units 8.

A control switch 87 is mounted in fixed relation to the cam plate 85. The control switch 87 includes an operating lever 88 which carries a roller 89, the roller 89 being positioned for engagement by the cam elements 86 so as to close the control switch at the desired time.

The control switch 87 is part of an electrical circuit including the solenoid 76. A first line wire 90 is connected to the solenoid 76. A second line wire 91 is connected to the control switch 87. Another wire 92 connects the control switch 87 to the solenoid 76. Thus, when the control switch 87 is closed, the solenoid 76 is actuated so as to shift the air valve 75 to a position whereby the plunger 73 of the fluid motor 72 is moved downwardly to pivot the lever 68 and elevate the die core 46. At this time, it is pointed out that although the control switch 87 has been described as a normally open switch, in the event it is desired that the thinner wall portion 38 of the tube 17 be shorter than the thick wall portion 37, then either the cam elements 86 may be shorter or the control switch 87 may be in the form of a normally closed control switch. Also, the same result may be obtained by reversing the lines 83 and 84 with respect to the fittings 80 and 81.

Reference is now had to FIGURE 7, wherein the tube 17 is illustrated in its expanded state. It is to be noted that by having the mold halves 12 and 14 engage the tube 17 at the intersection between the relatively thick portion 37 and adjoining relatively thin portion 38, after the tube 17 has been expanded, the bottle which is being formed will have a bottom wall, a body portion and a neck portion of substantially the same wall thickness. Heretofore, when the tube was of a constant wall thickness, the thickness of the neck portion was too great, and after the extra part on the top of the neck portion had been removed by a slicing operation, it was necessary to internally ream the neck portion in order to reduce the thickness thereof. By thinning the wall of the tube 17 in the vicinity of the neck portion, the neck portion of the bottle has substantially the same wall thickness as the body portion and, as a result, the reaming operation may be eliminated.

It is further pointed out that as the tube 17 is engaged by the mold units 8, there exist sections of the tube 17 between the mold units 8 which are not utilized. After the articles have been formed in the mold units, the sections of the tube 17 between the mold units are broken away and may be reprocessed for extrusion again. By forming these sections of the tube with a relatively thin wall, it will be seen that a saving of material may result.

Only a two step core has been illustrated. However, it is possible for the core to have more than two positions with respect to the die shell so that more than two wall thicknesses may be obtained in the same length of tube. Such an arrangement would require either a two stage actuator for the lever 68 or two actuators.

In addition to eliminating the normal reaming step in the neck of plastic bottles now being formed, the formation of the tube 17 with portions of different wall thicknesses will also permit a greater differential between the cross-section of the body portion of a bottle and the neck portion. Thus, it is possible with the tube 17 to form a plastic bottle having a very large body diameter and a relatively small neck diameter. This advantage will also be highly desirable in the molding of other types of articles.

While the extrusion die has been shown and described in conjunction with a specific type of molding machine, it will be understood that the use of the extrusion die is not limited to either this particular type of molding machine or to use in conjunction with a molding machine.

The extruding of a tube having a constant inside diameter, as compared to a constant outside diameter, is very important. In the first place, as stated above, by extruding a tube having an internal diameter equal to the internal diameter of the neck of the bottle to be formed, the reaming operation normally necessary in the formation of plastic bottles is eliminated. Secondly, the wall thickness of the tube being extruded may be increased to any thickness within reason when the internal diameter is held constant, as opposed to holding the external diameter constant, since with a constant external diameter the wall thickness, at a maximum, would be one-half of the external diameter of the tube. In addition to this, a space must be maintained within the tube for the passage of air, otherwise, the final product cannot be blown. It will, therefore, be readily apparent that a much greater variation of wall thickness may be obtained by varying the outside diameter of the plastic tube being extruded and holding the internal diameter constant, as compared to holding the external diameter constant and varying the internal diameter. Also, by permitting the core to move outside of the die orifice, an almost unlimited range of tube thicknesses, within the normal operating requirements, may be obtained.

When plastic material is being extruded through an extrusion die of the type disclosed herein, the working pressure of the plastic material within the chamber of the extrusion die is in the vicinity of 2,000 lbs. per square inch. Accordingly, any obstruction to the flow of the plastic material results in turbulence, which is undesirable. The turbulence which normally exists within an extrusion die is accentuated by tapered surfaces, and for this reason, tapered surfaces have been reduced to a minimum, and the forming surfaces of the die head and core have been made cylindrical to reduce the turbulence to a minimum.

From the foregoing, it will be seen that novel and advantageous construction has been provided for obtaining the desired ends. Attention is invited, however, to the possibility of making variations within the scope of the invention as claimed.

I claim:

1. In a machine for forming hollow articles by the expansion of tubing wherein the machine is of the type including an extruder for extruding tubing and a mold for receiving and shaping the tubing; a variable orifice extrusion die, said extrusion die including a die shell and a die core, said die core having a terminal portion of a maximum cross-section for defining the constant internal cross-section of tubing and an adjacent portion of a reduced cross-section, said die shell having a minimum cross-sectional forming area receiving selected portions of said die core to produce tubing of varying wall thickness, means mounting said die core for freedom of movement axially in the direction of flow of extruded material, said die core terminal portion being disposed in the direction of flow of the extruded material whereby said die core is urged in the direction of flow of the extruded material solely by the flow of extruded material over said die core with said die core terminal portion being out of said die shell and said reduced cross-sectional portion of said die core normally cooperates with said core shell to form tubing of a maximum wall thickness, and die core positioning means connected to said die core for moving said die core in a direction opposite from the direction of flow of the extruded material to a position where said die core terminal portion cooperates with said die shell to form tubing having a reduced wall thickness.

2. In a machine for forming tubing wherein the machine is of the type including an extruder; a variable orifice extrusion die, said extrusion die comprising a die shell and a die core, said die core having a terminal portion which is cylindrical in outline and a cylindrical adjacent portion of a reduced diameter, said die core being outwardly flared intermediate said terminal portion and said adjacent portion whereby tubing being extruded will flow over said terminal portion and have a constant internal diameter, said die shell having a minimum cross-sectional forming area selectively receiving said terminal portion and said adjacent portion of said die core to produce tubing of varying wall thickness, means mounting said die core for freedom of movement axially in the direction of flow of extruded material, said die core being urged out of said die shell solely by the flow of extruded material over said die core, means restricting movement of said die core out of said die shell to a position where said adjacent portion is aligned with said forming area and said terminal portion projects beyond said die core, and die core positioning means connected to said die core for retracting said die core to a position where said terminal portion is aligned with said forming area to reduce the wall thickness of the tubing.

3. In a machine for forming hollow articles having areas of reduced cross-section by the expansion of tubing wherein the machine is of the turret type including a shaft, a plurality of molds mounted on said shaft for rotation about the axis of said shaft in a common plane, a fixed extruder for continuously extruding tubing with said molds sequentially receiving and removing portions of the tubing; a variable orifice extrusion die, said extrusion die comprising a die shell and a die core, said die core having a terminal portion which is cylindrical in outline and a cylindrical adjacent portion of a reduced diameter, said die core being outwardly flared intermediate said terminal portion and said adjacent portion whereby tubing being extruded will flow over said terminal portion and have a constant internal diameter, said die shell having a minimum cross-sectional forming area selectively receiving said terminal portion and said adjacent portion of said die core to produce tubing of varying wall thickness, said die core being urged out of said die shell by the flow of extruded material over said die core, means restricting movement of said die core out of said die shell to a position where said adjacent portion is aligned with said forming area and said terminal portion projects beyond said die core, die core positioning means connected to said die core for retracting said die core to a position where said terminal portion is aligned with said forming area to reduce the wall thickness of the tubing and control means for the actuation of said die core positioning means in response to the rotation of said shaft.

4. The device of claim 3 wherein said molds engage said tubing at points remote from said extrusion head and said tubing has a predetermined pattern conforming to the internal configuration of the molds and the spacing of the molds.

5. In a machine for forming hollow articles having areas of reduced cross-section by the expansion of tubing wherein the machine is of the turret type including a shaft, a plurality of molds mounted on said shaft for rotation about the axis of said shaft in a common plane, a fixed extruder for continuously extruding tubing with said molds sequentially receiving and removing portions of the tubing; a variable orifice extrusion die, said extrusion die comprising a die shell and a die core, said die core having an end portion of a maximum cross section and an adjacent portion of a reduced cross-section, said die shell having an orifice defining portion at one end of said die shell, die core mounting means mounting said die core for longitudinal movement relative to said die shell, the flow of extruded material through said extrusion die acting on said die core end portion to urge said die core through said die shell, stop means on said die core restricting movement of said die core relative to said die shell and normally retaining said adjacent portion of said die core aligned with said orifice defining portion of said die shell to form tubing of a maximum wall thickness, and die core positioning means connected to said die core for moving said die core end portion into alignment with said die shell orifice defining portion to reduce the wall thickness of the tubing, and control means for the actuation of said die core positioning means in response to the rotation of said shaft.

6. The device of claim 5 wherein said die core positioning means includes a fluid motor, and said control means includes a control valve for said fluid motor and a plurality of cams on said shaft for positioning said control valve, there being one cam for each of said molds.

References Cited in the file of this patent
UNITED STATES PATENTS

| | | |
|---|---|---|
| 2,288,454 | Hobson | June 30, 1942 |
| 2,632,202 | Haines | Mar. 24, 1953 |
| 2,750,625 | Colombo | June 19, 1956 |
| 2,780,835 | Sherman | Feb. 12, 1957 |
| 2,784,452 | Ruekberg et al. | Mar. 12, 1957 |
| 2,859,476 | Lainson | Nov. 11, 1958 |